No. 717,518. Patented Dec. 30, 1902.
J. E. WOODBRIDGE.
MEANS FOR TRANSFORMING ALTERNATING CURRENTS.
(Application filed June 17, 1902.)
(No Model.)
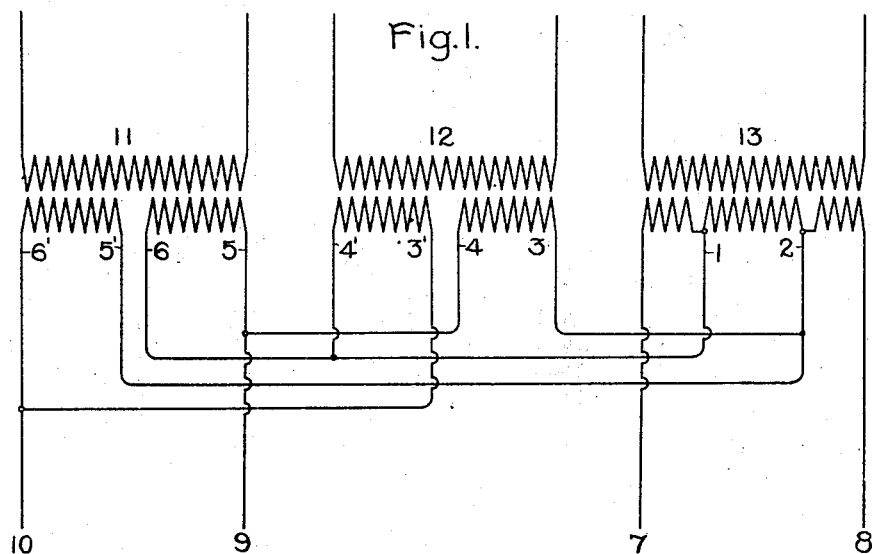
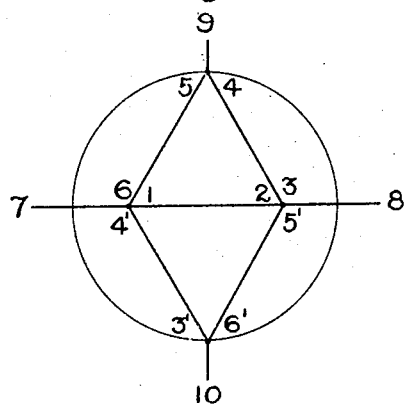
Witnesses.
Inventor.
Jonathan E. Woodbridge,
by
Atty.

UNITED STATES PATENT OFFICE.

JONATHAN E. WOODBRIDGE, OF SCHENECTADY, NEW YORK, ASSIGNOR TO GENERAL ELECTRIC COMPANY, A CORPORATION OF NEW YORK.

MEANS FOR TRANSFORMING ALTERNATING CURRENTS.

SPECIFICATION forming part of Letters Patent No. 717,518, dated December 30, 1902.

Original application filed July 28, 1900, Serial No. 25,090. Divided and this application filed June 17, 1902. Serial No. 112,036. (No model.)

*To all whom it may concern:*

Be it known that I, JONATHAN E. WOODBRIDGE, a citizen of the United States, residing at Schenectady, county of Schenectady, State of New York, have invented certain new and useful Improvements in Means for Transforming Alternating Currents, (Case No. 2,978, a division of my application Serial No. 25,090, filed July 28, 1900,) of which the following is a specification.

My present invention relates to a means for phase transformation of value in interchangeably transforming two-phase and three-phase systems, although it is not limited to use in this connection only. In means for phase transformation commonly employed the transforming capacity of the apparatus, as compared with its capacity for transforming the same power without changing the number of phases, is to some extent reduced by reason of increased heating due to the fact that the current in some of the windings is out of phase with the electromotive force of the windings themselves. In carrying my invention into operation I make use of a system of transformers in which at unit power factor the current in every winding is in phase with the electromotive force of that winding, thereby obviating the objection heretofore specified and attaining at the same time increased efficiency.

My invention will better be understood by reference to the following detailed description, while its points of novelty will be set forth in the claims appended thereto.

In the drawings, Figure 1 is a diagram of circuits representing an arrangement appropriate for transforming three-phase current to two-phase, or the reverse. Fig. 2 is a diagram of electromotive forces of assistance in explaining the connections set forth in Fig. 1.

In Fig. 1 it will be assumed that three-phase current is to be transformd to two-phase, thereby rendering one set of windings primary in their function and another set of windings secondary; but it is to be understood that these relations will be reversed in transforming from two-phase to three-phase. Merely by way of illustration, therefore, let the windings 11 12 13 represent primary windings connected to three-phase supply-mains. Each of the two primaries 11 and 12 is provided with two secondaries having the same electromotive force and current capacity. The primary 13, unlike the other primaries, is provided with a single secondary, which, however, has taps extending from intermediate points in its length, these taps being indicated at 1 2. The winding included between these taps is arranged to generate an electromotive force of the same value as that of any of the secondaries on the other transformers.

All of the secondaries above referred to are interlinked in a manner such as to present terminals from which two-phase currents may be derived. In order to accomplish this result, the secondaries may be connected so as to form a network of interlinked three-phase electromotive forces, such as represented by the vector diagram in Fig. 2. Referring to this diagram it will be seen that there are two equilateral triangles joined base to base, so as to form an equilateral polygon the diagonals of which form an angle of ninety degrees with each other. For convenience in explanation each side of this polygon is designated by two numbers placed, respectively, at its opposite ends. Since the paralled sides of the polygon represent duplicate electromotive forces, these sides have been designated by the same numbers, which, however, are distinguished from each other by suitable indexes. Thus the side 4 3 is produced by an electromotive force of the same value and phase as the side 4' 3'.

In connecting up the transformer-windings a circuit is first formed including a secondary from each of the transformers, these secondaries being connected up in series with each other—as, for example, by the circuit extending from the terminal 1 of the secondary of the transformer 13, through the secondary 6 5 of the transformer 11, then through the secondary 4 3 of the transformer 12, and back to the other terminal of the secondary 1 2. The diagram of electromotive forces is then represented by a triangle having its sides numbered in the order in which the current flows through the winding. The arrangement of electromotive forces corresponding to the connections just described is indicated in Fig. 2 by the sequence of terminals 1 6 5 4 3 2. The remaining secondaries 6' 5' and 4' 3' must now be connected up to the secondary 1 2 in a reverse order, so as to produce the arrangement of electromotive forces indicated in the lower part of the diagram in Fig. 2. These connections consist, as will readily be seen, of a circuit extending from the terminal 1 through the secondary 4' 3', then through the secondary 6' 5', and back to the terminal 2.

Referring to Fig. 2 it will readily be seen that one of the two-phase circuits extends from the free terminals 7 8 of the transformer 13, while the other two-phase circuit consists of two terminals 9 10, one of which leads from the conductor joining the secondary terminals 4 5, and the other from the conductor joining the secondary terminals 3' 6'.

In order to secure a symmetrical two-phase system the secondary winding 1 2 is extended on each side of the terminals 1 2 by an amount sufficient to make the electromotive force between the mains 7 and 8 equal to the resultant between the mains 9 10. From the geometry of the figure it will be seen that the electromotive force of the extended portions of the winding is equal to about one-third of that between the terminals 1 2.

What I claim as new, and desire to secure by Letters Patent of the United States, is—

1. The combination of three-phase-transformer windings of substantially equal electromotive force connected in closed circuit with each other so that their electromotive forces may be represented by an equilateral parallelogram, mains corresponding to one phase of a quarter-phase system connected to points in said closed circuit the electromotive force between which corresponds to a diagonal of said parallelogram, and another pair of mains corresponding to another phase of said system connected between points in said closed circuit the electromotive force between which corresponds to another diagonal of said parallelogram.

2. The combination of a plurality of windings constituting seats of equal three-phase electromotive forces, another winding also the seat of a three-phase electromotive force which however is greater in value than the electromotive force of any of the first-mentioned windings, mains corresponding to one phase of a quarter-phase system connected to the terminals of the winding having the greater electromotive force, and connections interlinking the other windings with mains corresponding to the other phase of said system.

3. In a system of phase-transformation, the combination of a winding, two other windings connected in delta relation to an intermediate portion of the first, and a system of multiphase mains two of which are connected to the terminals of the first-mentioned winding and a third to the junction of the other two windings.

4. In a system of phase-transformation, the combination of a winding, two other windings connected in delta relation to an intermediate portion of the first, and a system of multiphase mains two of which are connected to the terminals of the first-mentioned winding, and a third to the junction of the other two windings, and means for developing three-phase electromotive forces in said windings.

5. In a system of phase-transformation, the combination of three windings having an intermediate portion of one connected in delta relation to the other two, a three-phase system inductively related to said windings, and quarter-phase mains extending from said windings.

6. In a system of phase-transformation, the combination of three delta-connected windings, a main extending from the junction between two of said windings, other mains extending from points in the third winding other than the points of junction with the first two windings, and a multiphase system inductively related to said windings.

In witness whereof I have hereunto set my hand this 16th day of June, 1902.

JONATHAN E. WOODBRIDGE.

Witnesses:
BENJAMIN B. HULL,
HELEN ORFORD.